(12) United States Patent
Schlesener et al.

(10) Patent No.: US 9,226,104 B2
(45) Date of Patent: Dec. 29, 2015

(54) METHODS AND SYSTEMS FOR DISABLING TEXT MESSAGING WHILE DRIVING

(75) Inventors: Matthew C. Schlesener, Shawnee, KS (US); Brian D. Mauer, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1934 days.

(21) Appl. No.: 12/263,964

(22) Filed: Nov. 3, 2008

(65) Prior Publication Data

US 2010/0113073 A1 May 6, 2010

(51) Int. Cl.
*H04W 4/00* (2009.01)
*H04W 4/02* (2009.01)
*H04W 4/14* (2009.01)
*H04M 1/725* (2006.01)

(52) U.S. Cl.
CPC ............ *H04W 4/02* (2013.01); *H04M 1/72577* (2013.01); *H04M 1/72552* (2013.01); *H04W 4/14* (2013.01)

(58) Field of Classification Search
USPC ........................... 455/466, 404.2, 456.1–457, 455/556.1–556.2
See application file for complete search history.

(56) References Cited

U.S. PATENT DOCUMENTS

| | | | |
|---|---|---|---|
| 6,256,558 B1 | 7/2001 | Sugiura et al. | |
| 6,353,778 B1 | 3/2002 | Brown | |
| 6,690,940 B1 | 2/2004 | Brown et al. | |
| 7,142,666 B1 | 11/2006 | Bates et al. | |
| 7,181,229 B2 | 2/2007 | Singh et al. | |
| 2002/0138271 A1 | 9/2002 | Shaw | |
| 2003/0109246 A1 | 6/2003 | Shimizu et al. | |
| 2005/0255874 A1 | 11/2005 | Stewart-Baxter et al. | |
| 2005/0283726 A1 | 12/2005 | Lunati | |
| 2005/0288024 A1* | 12/2005 | Song | 455/441 |
| 2006/0058036 A1* | 3/2006 | Watanabe et al. | 455/456.1 |
| 2006/0099940 A1 | 5/2006 | Pfleging et al. | |
| 2007/0032225 A1* | 2/2007 | Konicek et al. | 455/417 |
| 2007/0072553 A1* | 3/2007 | Barbera | 455/67.11 |
| 2009/0098855 A1 | 4/2009 | Fernandez et al. | |
| 2009/0111422 A1 | 4/2009 | Bremer et al. | |

FOREIGN PATENT DOCUMENTS

| | | | | |
|---|---|---|---|---|
| EP | 1 589 727 | 10/2005 | | |
| GB | 2420059 | 5/2010 | | |
| JP | 2003316252 A | * 11/2003 | ............. | G09B 13/04 |

OTHER PUBLICATIONS

International Search Report and Written Opinion of the International Search Authority from International Application No. PCT/US09/63119, dated Feb. 12, 2010.

EPO Published Abstract of Japanese Publication No. 2003 316252, published Nov. 7, 2003.

(Continued)

*Primary Examiner* — Suhail Khan

(57) ABSTRACT

Methods and systems are provided for disabling text messaging while driving. In one embodiment, a mobile station makes a first determination that it is moving at greater than a threshold rate. The mobile station makes a second determination that, while it is moving at greater than the threshold rate, an outgoing text message reflects more than a threshold degradation in typing proficiency. In response to making the first and second determinations, the mobile station disables a text-message-sending capability.

25 Claims, 3 Drawing Sheets

(56) References Cited

OTHER PUBLICATIONS

U.S. Appl. No. 12/781,427, filed May 17, 2010 in the name of Halferty et al., entitled "Methods and Systems for Disabling Text Messaging", Unpublished.

Halfbakery, "Cell Phone Block While Driving," http://www.halfbakery.com/idea/Cell_20Phone_20Block_20While_20Driving, printed from the World Wide Web on Apr. 8, 2010.

AppScout: More Mobile Software, "Textecution Saves Lives by Killing Text, Internet While Driving," http://www.appscout.com/mobile_software/more.php?p=1, printed from the World Wide Web on Jan. 16, 2009.

Johnson, "TXTBlocker Lets Users Disable Texting and Other Features While Driving," http://www.hothardware.com/.../TXTBlocker-Lets_. . . , printed from the World Wide Web on Jan. 4, 2010.

"ZoomSafer eliminates the temptation to text while driving and keeps you connected via hands-free services", http://www.zoomsafter.com/personal.aspx, printed from the World Wide Web on Jan. 4, 2010.

Halfbakery, "Cell Phone Use Control," http://www.halfbakery.com/idea/Cell_20Phone_20Use_20Control, printed from the World Wide Web on Nov. 9, 2007.

\* cited by examiner

METHODS AND SYSTEMS FOR DISABLING TEXT MESSAGING WHILE DRIVING

BACKGROUND

1. Technical Field

The present disclosure relates to wireless communications, and, more particularly, to features and services, such as text messaging, of mobile stations.

2. Description of Related Art

Many people use mobile stations, such as cell phones and personal digital assistants, to communicate with cellular wireless networks, which typically provide communication services such as voice, text messaging, and packet-data communication. These mobile stations and networks typically communicate with each other over a radio frequency (RF) air interface according to a wireless protocol. Mobile stations typically conduct wireless communications with one or more base transceiver stations (BTSs), each arranged to send communications to and receive communications from mobile stations over the RF air interface.

Each BTS (sometimes referred to as a Node-B) is in turn communicatively connected with a network entity known as a base station controller (BSC) (sometimes referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. For example, an MSC may interface with the well-known public switched telephone network (PSTN). As another example, a PDSN may interface with one or more core packet data networks and/or the global Internet. As such, mobile stations can typically communicate over the one or more signaling and/or transport networks from anywhere inside the coverage area of one or more BTSs, via the BTS(s), a BSC, and a switch or gateway such as an MSC and/or a PDSN.

SUMMARY

Methods and systems are provided for disabling text messaging while driving. In one aspect, an embodiment may take the form of a method. In accordance with the method, a mobile station makes a first determination that it is moving at greater than a threshold rate. The mobile station makes a second determination that, while it is moving at greater than the threshold rate, an outgoing text message reflects more than a threshold degradation in typing proficiency. In response to making the first and second determinations, the mobile station disables a text-message-sending capability.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
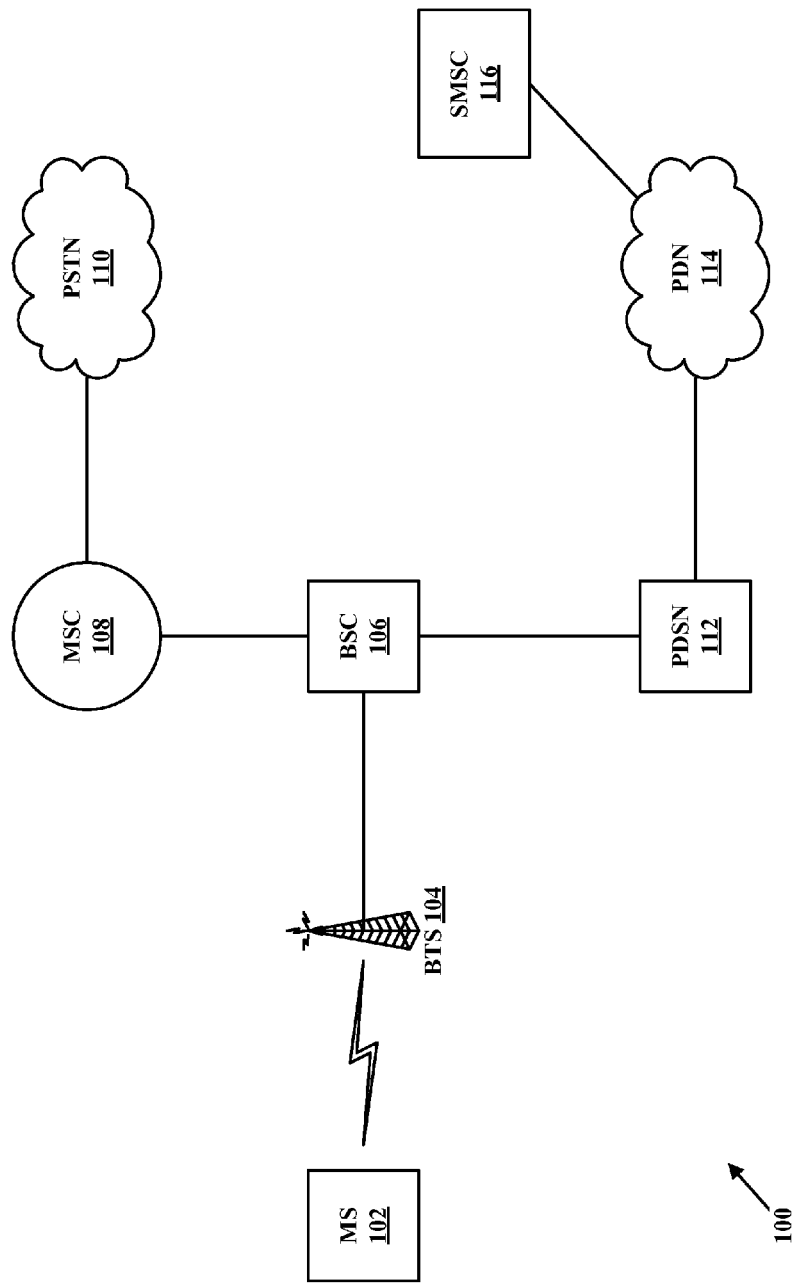
FIG. 1 is a simplified block diagram of a communication system, in accordance with exemplary embodiments.

As mentioned above, most currently-available mobile stations provide their users with the ability to send and receive text messages, which typically are SMS (Short Message Service) messages. To send a text message, a user of a mobile station typically uses a touchscreen, keypad, keyboard, stylus, and/or any other input mechanism(s) to launch a text-messaging application, select one or more recipients of the message, enter the substance (i.e. body) of the message, and then invoke a Send command. At that point, the mobile station responsively sends the entered message to the one or more recipients via one or more network entities, such as but not limited to a Short Message Service Center (SMSC). When a mobile station receives a text message, the mobile station typically alerts its user with some sort of audible, visible, and/or tactile (e.g. vibrating) alert, at which point the user can display and read the message.

Text messaging has become extremely popular, and becomes more so every day. Users of mobile stations send and receive texts at all times of the day, and while doing all sorts of activities. As examples, users send and receive text messages in school, at work, on the train, on the bus, etc. Users even send text messages while driving, which can often create dangerous situations on the road for those users, their passengers, passengers of other vehicles, pedestrians, etc. It is simply often not possible for users to dedicate sufficient focus to operating a vehicle while also devoting enough focus to successfully compose and send text messages. And as the use of text messaging continues to become more and more popular, the danger to society of users engaging in text-messaging activities while driving increases commensurately. As such, a number of state and local governments have outlawed the practice.

In accordance with the presently-described methods and systems, a mobile station detects conditions that indicate that its user is—or likely is—operating a vehicle (car, truck, motorcycle, bicycle, etc.), and responsively disables the mobile station's ability to send text messages. In some embodiments, the mobile station also disables the ability to receive text messages; in other embodiments, the mobile station disables the visible presentation of received text messages. The mobile station detects that its user is or likely is driving in part by detecting that the user is composing messages (e.g. typing) with a proficiency that is below that user's normal proficiency, which the mobile station may accordingly track as a general matter. This proficiency determination may include considerations such as frequency of misspellings, frequency of using a backspace function, frequency of correcting/changing a word/letter, and so on.

Thus, a mobile station includes and executes an application or other software or hardware that records data reflecting its user's default (i.e. normal, i.e. non-driving) level of text-message-typing proficiency. Note that "typing" as used herein includes use of a keyboard, any other input mechanism mentioned herein, and/or any other input mechanism now known or later developed for inputting a text message into a mobile station. The mobile station may track metrics such as the user's average typing speed, frequently-used words, frequency of backspacing, etc.

The mobile station also monitors its motion, which it may do according to a number of handoffs in a certain time period, by use of GPS or other location technology, with one or more internal or external motion sensors such as accelerometers, by using any other motion-detecting technology described herein, and/or by using any other technology now known or later developed for detecting a degree of motion of a mobile station, including technologies performed by the mobile station without assistance, technologies that involve one or more network or other entities, and/or any other suitable means or technologies.

In accordance with an embodiment, if the mobile station detects both that (a) it is moving at more than a threshold rate and (b) its user is typing a text message with less than a threshold degree of proficiency, the mobile station responsively disables at least its text-message-sending function. Note that this may involve disabling its ability to receive text-message input from its user, disabling its ability to send entered messages, and/or disabling any other functionality necessary for enabling the composition and transmission of text messages.

The mobile station detecting that its user is entering (or has entered) a text message with less than a threshold degree of typing proficiency—or with more than a threshold degradation in typing proficiency—may include detecting more than a threshold decrease in typing speed with respect to the user's default typing speed, more than a threshold increase with respect to misspelling words (e.g. in number, percentage of overall message, and/or frequency, etc.), more than a threshold increase in backspacing and/or correcting (e.g. number, frequency, etc.), and/or one or more other negative changes in typing proficiency with respect to the user's default. In other embodiments, a default based on the user's historical proficiency may not be utilized; in one such example, there may simply be a threshold number of backspaces, a threshold typing speed, and/or any other threshold(s) based not on the particular user, but on some other basis, such as purposefully-selected absolute numbers, averages among many users, etc.

In one embodiment, the mobile station's text-message-sending capability (and any other disabled capability such as receiving texts and/or displaying received texts) may remain disabled until the mobile station determines that its current motion is less than or equal to a given threshold rate, perhaps equal to or substantially equal to zero. In some embodiments, the mobile station may require that this zero or slow-motion condition persist for a threshold time period before any text-messaging-related capabilities are re-enabled. Thus, in times where the degree of motion is sufficient to conclude that the mobile station is in a moving vehicle, the mobile station will monitor the user's text-messaging behaviors for negative derivations from the norm, such as slower typing, more misspellings, more backspacing, etc. If the mobile station detects sufficient motion and sufficient degradation in texting proficiency, the mobile station will disable text-sending capabilities, perhaps until the degree of motion no longer indicates vehicle motion.

In some embodiments, a detection of degradation in typing proficiency may be or include detection that a user has typed one or more known words correctly but for the striking of one or more incorrect letters, where the incorrect letters are adjacent or proximate to the correct letters on the keyboard. In some embodiments, a detection of degradation in typing proficiency may be particular to a given text-entry mode (such as T9, alpha, etc.); as such, recorded tendencies may also be text-entry-mode specific. In some embodiments, typing speed may be measured in terms of characters per second, words per second, characters per minute, characters per second, total time to type an entire message, and/or any other suitable typing-speed metric.

In some embodiments in which a mobile station has disabled text sending and received-text displaying, received texts are queued (i.e. stored) for later viewing. In other embodiments in which a mobile station has disabled text sending and received-text displaying, received texts could be spoken aloud to the user using a text-to-speech function. In an embodiment, disabling text sending may mean disabling only manual keying of text messages; that is, the mobile station may still permit audio input and accordingly make use of a speech-to-text function and one or more speech commands for purposes of message composition and sending. In some embodiments, another mobile station, an e-mail account, and/or one or more other devices and/or accounts may be notified that the mobile station's text-sending capability has been disabled due to a detection of indications of texting while driving; this may be used, for instance, to alert a parent that a teenager was most likely texting while driving.

Note that it is explicitly contemplated that users have different default behaviors and abilities. That is, some users may intentionally misspell words and/or use alternate spellings (such as "l8r" or "l8er" instead of "later" (whereas "l7er" may well be a mistake)). And some users may unintentionally misspell words on a frequent basis. Thus, in some embodiments, a mobile station compares the user's current typing proficiency to their usual typing proficiency as learned by the mobile station over time, rather than to an absolute standard of proficiency. In other embodiments, an absolute standard or an average-of-multiple/many-users standard is used.

And it should be noted that the above overview is intended to be illustrative and not limiting. Additional and/or different features may be present in some embodiments. In some embodiments, analysis of motion and/or typing proficiency may be performed in whole or in part by one or more network entities separate from the mobile station. Furthermore, any description of a mobile station, base station, or other network element communicating or providing service according to any particular protocol is by way of example and not limitation; any suitable wireless protocol(s) may be used, such as CDMA, TDMA, AMPS, GSM, GPRS, UMTS, EDGE, EV-DO, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS)

104, a base station controller (BSC) 106, a mobile switching center (MSC) 108, a public switched telephone network (PSTN) 110, a packet data serving node (PDSN) 112, a packet-data network (PDN) 114, and a short message service center (SMSC) 116. And additional entities could be present as well. For example, there could be additional mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also or instead be arranged to communicate according to one or more other types (e.g. protocols) mentioned herein and/or any others now known or later developed. The processor and data storage may be any suitable components known to those of skill in the art. As examples, mobile station 102 could be or include a cell phone or a PDA.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more coverage areas such as cells and sectors, for communicating with mobile stations, such as mobile station 102, over an air interface. The communication interface may be arranged to communicate according to one or more protocols mentioned herein and/or any others now known or later developed. The communication interface may also include one or more wired and/or wireless interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. In one example, PDN 114 may include both the Internet and a private core packet-data network operated by a wireless carrier that operates BTS 104, BSC 106, etc. Devices in communication with PDN 114 may exchange data using a packet-switched protocol such as the Internet Protocol (IP), and may be identified by an address such as an IP address.

SMSC 116 may be any networking element arranged to carry out the SMSC functions described herein. As such, SMSC 116 may include a communication interface, a processor, and data storage comprising instructions executable by the processor for carrying out those SMSC functions. The communication interface may include one or more wired and/or wireless interfaces for communicating with at least PDN 114. In general, SMSC 116 functions to enable SMS messaging between and among various entities by providing store-and-forward services with respect to SMS messages, along with one or more other suitable services for enabling the aforementioned SMS communication. Note that an entity other than an SMSC may be used instead or as well to enable text-messaging communication regardless of protocol.

3. Exemplary Operation a. A First Exemplary Method

Figure 2:
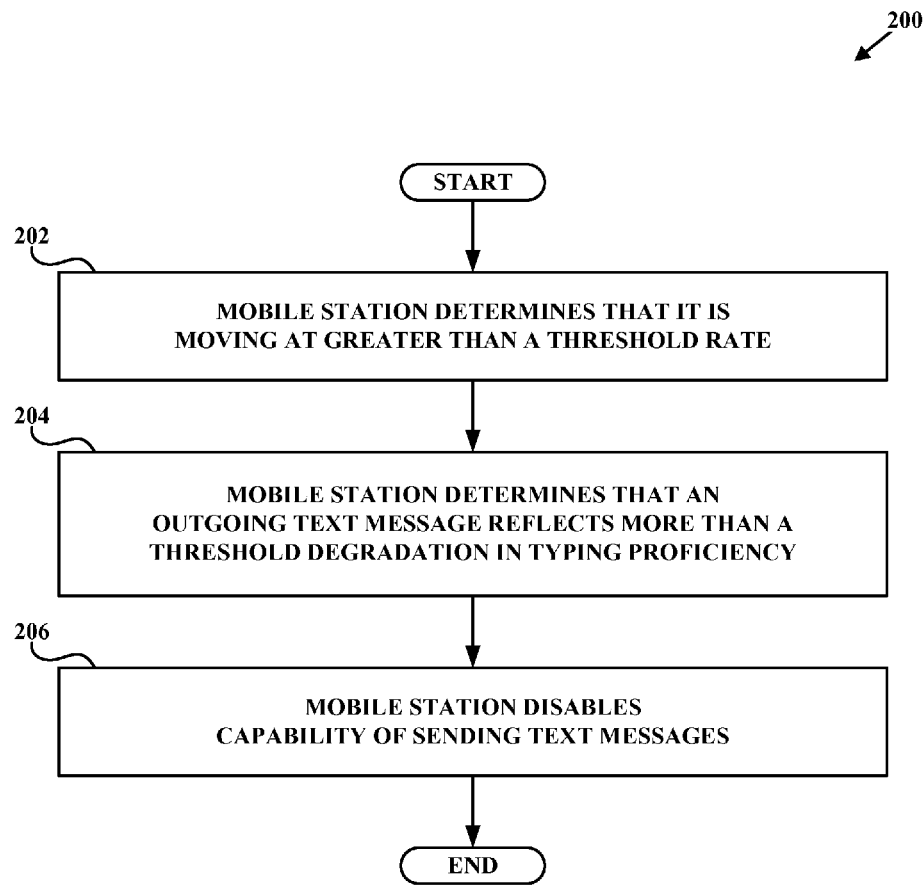
FIG. 2 is a flowchart of a method, in accordance with exemplary embodiments.

FIG. 2 depicts a flowchart of an exemplary method, in accordance with an exemplary embodiment. Note that method 200 is carried out by a mobile station, and is described with respect to mobile station 102 in particular. In some embodiments, method 200 may be carried out by a mobile station in cooperation with one or more other entities described herein and/or one or more other suitable entities of any type.

As shown in FIG. 2, method 200 begins at step 202, when mobile station 102 makes a first determination that it is moving at greater than a threshold rate. In one embodiment, step 202 may involve mobile station 102 detecting more than a threshold number of handoffs in a particular amount of time. In another embodiment, step 202 may involve mobile station 102 determining its translational rate of motion (perhaps using a positioning technology such as GPS), and further determining that its translational rate of motion exceeds the threshold rate. In yet another embodiment, step 202 may involve mobile station 102 using a motion sensor (such as an internal accelerometer, for example).

At step 204, mobile station 102 makes a second determination that, while it is moving at greater than the threshold rate (which was determined in step 202), an outgoing text message reflects more than a threshold degradation in typing proficiency. Note that the outgoing text message referred to by step 204 may be a text message that is currently being composed for the purpose of thereafter sending it; note, however, that the outgoing text message may just as well be one for which composition was completed and a Send command had been invoked. In other embodiments, the outgoing text message could be one that had already been sent. And other possibilities exist as well without departing from the present methods and systems.

In some embodiments, step 204 may involve mobile station 102 maintaining data reflecting a first level of typing proficiency, determining a current level of typing proficiency reflected by the outgoing text message; and determining that the current level is lower than the first level by more than a proficiency threshold. If one typing-proficiency metric is used, than the first level, current level, and proficiency threshold may all be in terms of that metric. If more than one metric is used, however, than a respective first level, current level, and threshold may be used for each such metric. And the determination as to whether the message meets or fails a test may be in terms of failing all the metrics, a certain number of the metrics, a certain percentage of the metrics, and/or any other suitable scheme.

With respect to particular metrics, one or more of the following may be used: number of misspellings, frequency of misspellings, number of uses of a backspace function, frequency of using the backspace function, number of corrections made, frequency of correcting entered text, typing speed, and input of at least one incorrect letter positioned adjacent a correct letter on a user interface. And one or more other metrics could be used instead or in addition without departing from the present methods and systems.

In some embodiments, a first level, current level, and proficiency threshold may be specific to a given mode of text entry. In some embodiments, the first level (i.e. the default level of typing proficiency for comparison with a current level) corresponds to historical data reflecting an actual typing proficiency of a user of mobile station 102. In those embodiments, mobile station 102 would record and maintain this historical data as the user engages in text-messaging activities over some period of time. In other embodiments, the first level corresponds to data reflecting average typing proficiency of multiple users. This data could be provisioned into and/or downloaded by mobile station 102.

At step 206, in response to making the first and second determinations (in steps 202 and 204, respectively), mobile station 102 disables a text-message-sending capability. In some embodiments, step 206 may involve mobile station 102 disabling at least one of (a) its ability to receive text-message input from a user and (b) its ability to transmit entered text messages. In some embodiments, step 206 may involve mobile station 102 disabling the text-message-sending capability for a predetermined amount of time. In other embodiments, step 206 may involve mobile station 102 disabling the text-message-sending capability until mobile station 102 detects that it is no longer moving at greater than the threshold rate. In still other embodiments, step 206 may involve mobile station 102 disabling the text-message-sending capability until mobile station 102 detects that it has not been moving at greater than the threshold rate for at least a predetermined amount of time.

In some embodiments, mobile station 102 may, further in response to making the first and second determinations, disable a text-message-receiving capability. In some embodiments, mobile station 102 may, further in response to making the first and second determinations, disable visible presentation of received text messages. In these embodiments, mobile station 102 may also enables audible presentation of received text messages; mobile station 102 may also or instead store any received text messages for later viewing. In some embodiments, mobile station 102 disabling the text-message-sending capability may involve mobile station 102 (a) disabling manual keying of text messages and (b) enabling audio input of text messages.

In some embodiments, mobile station 102 may, further in response to making the first and second determinations, cause an alert to be sent to at least one of a second mobile station, a phone number, and an e-mail address. In some of these embodiments, mobile station 102 may send the alert itself. In other of these embodiments, mobile station 102 may send a request to one or more network entities, where the request causes one or more such alerts to be sent. And still other possibilities exist as well, without departing from the present methods and systems.

b. A Second Exemplary Method

Figure 3:
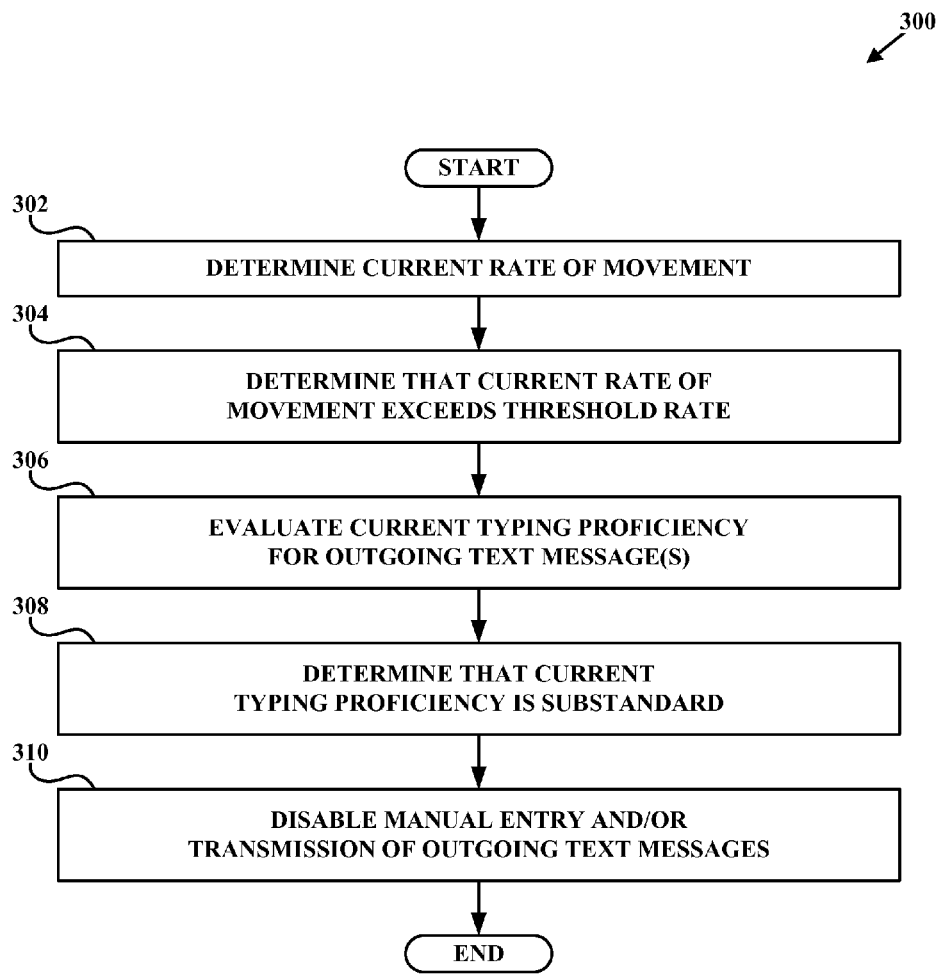
FIG. 3 is a flowchart of a method, in accordance with exemplary embodiments.

FIG. 3 is a flowchart of a second exemplary method, in accordance with an exemplary embodiment. In particular, FIG. 3 depicts a method 300, which may be carried out by a mobile station such as mobile station 102. In other embodiments, the method may be carried out by another network entity mentioned herein, some other network entity, or any combination thereof. Method 300 is similar to method 200, and thus is not described in as great of detail. And it is explicitly contemplated that any possibilities and permutations discussed herein with respect to any embodiment may be just as well applied to method 300.

As shown in FIG. 3, method 300 begins at step 302, when a current rate of movement of mobile station 102 is determined. Step 302 may be carried out using any of the rate-determining strategies described herein and/or any other suitable strategy. At step 304, it is determined that the current rate of movement of mobile station 102 exceeds a threshold rate of movement. This step may be carried out by simple numerical comparison.

At step 306, in response to the determination made in step 304, a current level of typing proficiency with respect to at least one outgoing text message is evaluated. Step 306 may be carried out using any of the typing-proficiency-evaluating metrics described herein and/or any other suitable metrics. At step 308, as a result of conducting the aforementioned evaluating in step 306, it is determined that the current level of typing proficiency is substandard. This determination may result from comparing one metric to one threshold, several metrics to several respective thresholds, and/or by way of any other suitable strategy. The one or more thresholds could be based on historical typing proficiency of the user of mobile station 102, some absolute standard, an average proficiency across multiple mobile stations, and/or any other standard.

At step 310, in response to the determination made in step 308, at least one of (a) an ability of mobile station 102 to accept manual entry of outgoing text messages and (b) an ability of mobile station 102 to transmit outgoing text messages is disabled.

4. Conclusion

Various exemplary embodiments have been described above. Those skilled in the art will understand, however, that changes and modifications may be made to those examples without departing from the scope of the claims.

The invention claimed is:

1. A method comprising:
    a mobile station making a first determination that it is moving at greater than a threshold rate;
    the mobile station making a second determination that, while it is moving at greater than the threshold rate, an outgoing text message reflects more than a threshold degradation in typing proficiency; and
    in response to making the first and second determinations, the mobile station disabling a text-message-sending capability.

2. The method of claim 1, wherein the mobile station comprises at least one of a cellular phone and a personal digital assistant (PDA).

3. The method of claim 1, wherein the outgoing text message is an outgoing Short Message Service (SMS) message, and wherein the text-message-sending capability is an SMS-message-sending capability.

4. The method of claim 1, wherein the mobile station making the first determination comprises the mobile station detecting more than a threshold number of handoffs in a particular amount of time.

5. The method of claim 1, wherein the mobile station making the first determination comprises the mobile station determining its translational rate of motion, and further determining that its translational rate of motion exceeds the threshold rate.

6. The method of claim 1, wherein the mobile station making the first determination comprises the mobile station using a positioning technology.

7. The method of claim 6, wherein the positioning technology comprises GPS (Global Positioning System) technology.

8. The method of claim 1, wherein the mobile station making the first determination comprises the mobile station using a motion sensor.

9. The method of claim 1, wherein the mobile station making the second determination comprises the mobile station:
    maintaining data reflecting a first level of typing proficiency;
    determining a current level of typing proficiency reflected by the outgoing text message; and
    determining that the current level is lower than the first level by more than a proficiency threshold.

10. The method of claim 9, carried out with respect to at least one typing-proficiency metric selected from the group of metrics consisting of number of misspellings, frequency of misspellings, number of uses of a backspace function, frequency of using the backspace function, number of corrections made, frequency of correcting entered text, typing speed, and input of at least one incorrect letter positioned adjacent a correct letter on a user interface.

11. The method of claim 9, carried out with respect to a specific mode of text entry.

12. The method of claim 9, wherein the first level corresponds to historical data reflecting an actual typing proficiency of a user of the mobile station.

13. The method of claim 9, wherein the first level corresponds to data reflecting average typing proficiency of multiple users.

14. The method of claim 1, wherein the mobile station disabling the text-message-sending capability comprises the mobile station disabling at least one of (a) its ability to receive text-message input from a user and (b) its ability to transmit entered text messages.

15. The method of claim 1, wherein the mobile station disabling the text-message-sending capability comprises the mobile station disabling the text-message-sending capability for a predetermined amount of time.

16. The method of claim 1, wherein the mobile station disabling the text-message-sending capability comprises the mobile station disabling the text-message-sending capability until the mobile station detects that it is no longer moving at greater than the threshold rate.

17. The method of claim 1, wherein the mobile station disabling the text-message-sending capability comprises the mobile station disabling the text-message-sending capability until the mobile station detects that it has not been moving at greater than the threshold rate for at least a predetermined amount of time.

18. The method of claim 1, wherein, further in response to making the first and second determinations, the mobile station disables a text-message-receiving capability.

19. The method of claim 1, wherein, further in response to making the first and second determinations, the mobile station disables visible presentation of received text messages.

20. The method of claim 19, wherein, further in response to making the first and second determinations, the mobile station enables audible presentation of received text messages.

21. The method of claim 19, wherein, further in response to making the first and second determinations, the mobile station stores received text messages for later viewing.

22. The method of claim 1, wherein, further in response to making the first and second determinations, the mobile station causes an alert to be sent to at least one of a second mobile station, a phone number, and an e-mail address.

23. The method of claim 1, wherein the mobile station disabling the text-message-sending capability comprises the mobile station (a) disabling manual keying of text messages and (b) enabling audio input of text messages.

24. A mobile station comprising:
    a wireless-communication interface;
    a processor; and
    data storage having stored therein instructions executable by the processor for carrying out functions including:
        the mobile station making a first determination that it is moving at greater than a threshold rate;
        the mobile station making a second determination that, while it is moving at greater than the threshold rate, an outgoing text message reflects more than a threshold degradation in typing proficiency; and
        in response to making the first and second determinations, the mobile station disabling a text-message-sending capability.

25. A method comprising:
    determining a current rate of movement of a mobile station;
    determining that the current rate of movement of the mobile station exceeds a threshold rate of movement;
    in response to determining that the current rate of movement of the mobile station exceeds the threshold rate of movement, evaluating a current level of typing proficiency with respect to at least one outgoing text message;
    as a result of evaluating the current level of typing proficiency with respect to the at least one outgoing text message, determining that the current level of typing proficiency is substandard; and
    in response to determining that the current level of typing proficiency is substandard, disabling at least one of (a) an ability of the mobile station to accept manual entry of outgoing text messages and (b) an ability of the mobile station to transmit outgoing text messages.

* * * * *